Sept. 23, 1930.                E. HARVEY                1,776,728
                              ANTISKID DEVICE
                        Filed Dec. 17, 1927      2 Sheets-Sheet 1
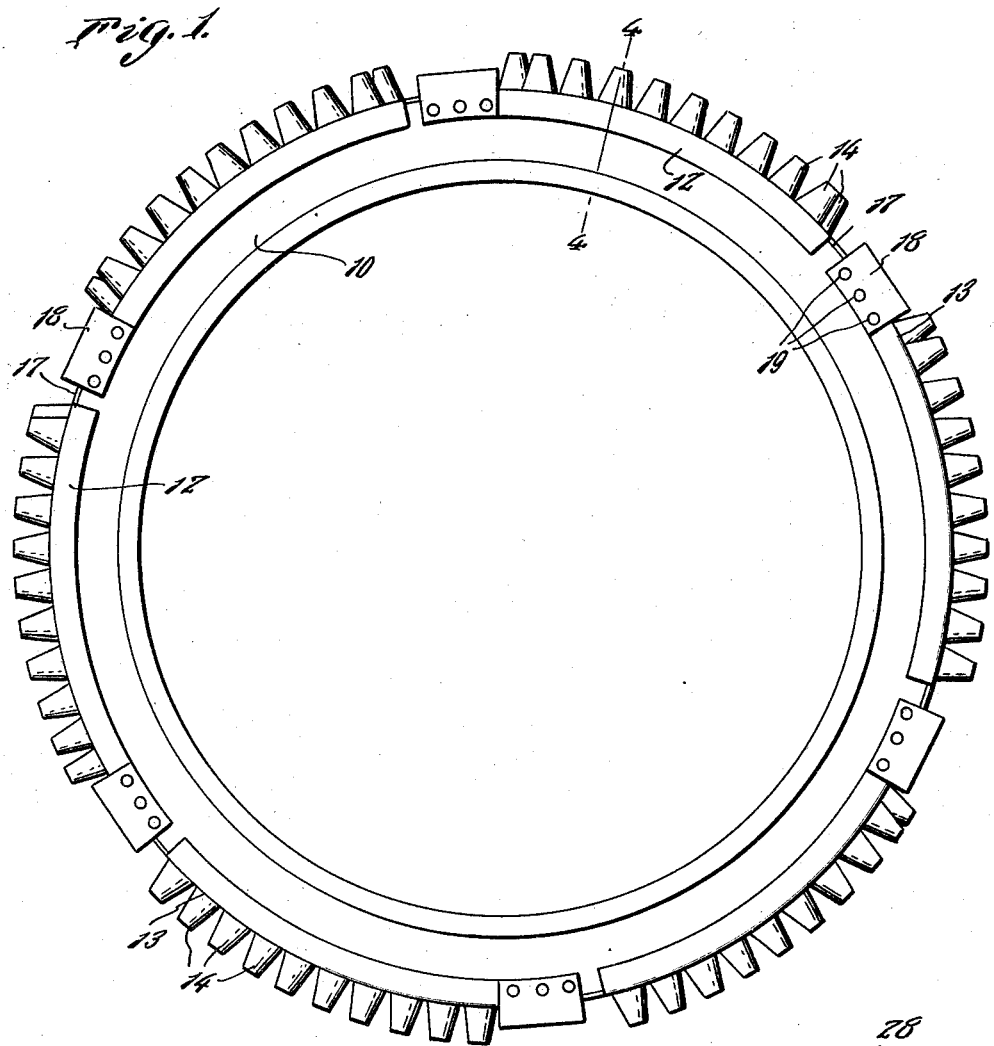
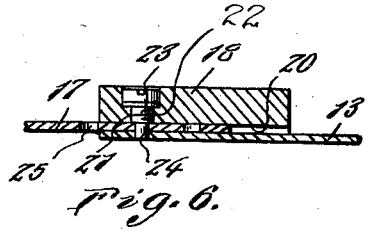
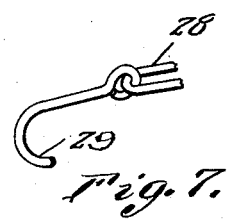
Earl Harvey
INVENTOR
BY Victor J. Evans
ATTORNEY Sept. 23, 1930.  E. HARVEY  1,776,728
ANTISKID DEVICE
Filed Dec. 17, 1927  2 Sheets-Sheet 2
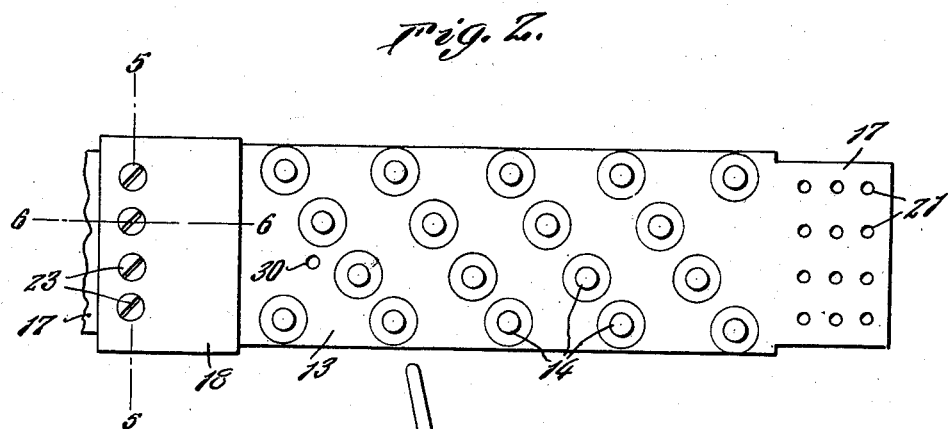
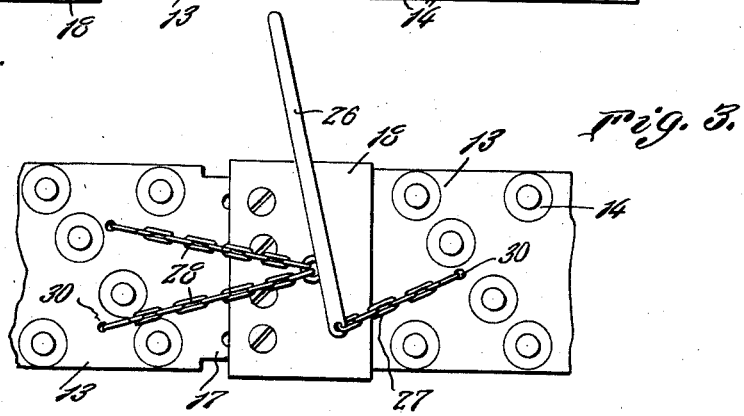
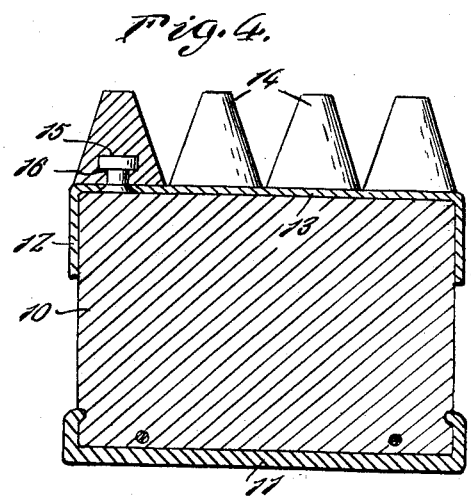
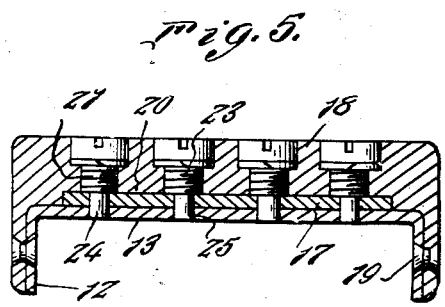
Earl Harvey
INVENTOR
BY Victor J. Evans
ATTORNEY Patented Sept. 23, 1930

1,776,728

UNITED STATES PATENT OFFICE

EARL HARVEY, OF WALL, PENNSYLVANIA

ANTISKID DEVICE

Application filed December 17, 1927. Serial No. 240,803.

This invention relates to improvements in anti-skid devices for vehicle tires, an object being to provide a device which may be removably placed upon a tire to provide an anti-skid tread surface.

Another object of the invention is the provision of a device of this character which is of sectional formation, means being provided for detachably connecting the sections so that the device may be conveniently applied and removed, means being also provided for drawing the sections together prior to connecting said sections, so that the device will snugly fit the tire.

With the above and other objects in view, the invention further includes the following novel features and details of construction, to be hereinafter more fully described, illustrated in the accompanying drawings and pointed out in the appended claim.

In the drawings:—

Figure 1 is a side elevation showing a vehicle tire equipped with the invention.

Figure 2 is a fragmentary plan view of the tread surface of the device.

Figure 3 is a similar view illustrating the manner of drawing the sections together prior to securing the sections in position.

Figure 4 is an enlarged sectional view on the line 4—4 of Figure 1.

Figure 5 is a sectional view on the line 5—5 of Figure 2.

Figure 6 is a fragmentary section on the line 6—6 of Figure 2.

Figure 7 is a detail perspective view showing the hooked end of one of the chains of the section adjuster.

Referring to the drawings in detail wherein like characters of reference denote corresponding parts, the reference character 10 indicates a tire which is shown as a solid tire and which is carried by a rim 11, this tire being shown for the purpose of illustrating the application of the device.

The device is formed of separate sections 12 and each of these sections comprises a transversely channel-shaped base 13 which is shaped to fit the periphery of the tire. This base is provided with anti-friction devices 14 which extend outwardly from the tread portion of the base. The devices 14 may be made of any suitable material and secured in any suitable manner. The devices shown are provided with recesses 15 which receive headed studs 16 carried by the base. They are shown as of substantially conical formation and are arranged in staggered relation so as to present a maximum number of anti-friction devices to the surface upon which the tire is travelling.

The base 12 is provided at one end with a tongue 17 which is preferably of less width than the width of the base, while at its opposite end, the base is provided with a transversely extending substantially U-shaped member 18 whose opposite ends are secured to the base as shown at 19. The member 18 has its inner face recessed and cooperates with the base 13 to provide a pocket 20 which receives the tongue 17 so that the tongue of one section has a sliding engagement with the pocket provided in the adjacent end of another section.

In order to secure the adjacent ends of the sections together so as to provide a continuous device, the tongues 17 are provided with spaced rows of openings 21, while the member 18 is provided with a row of spaced interiorly threaded sockets 22 which receive screws 23. Extending from these screws are pins 24 which are preferably of a less diameter than the screws and these pins pass through the openings 21 of the tongue 17 and enter openings 25 provided in that portion of the base which forms the inner wall of the pocket 20. This is clearly shown in Figure 5 of the drawings and it will be seen by reference to this figure that by backing the screws 23 outward, the pins 24 may be removed from the openings so as to release the tongues.

By reference to Figure 2 of the drawings it will be seen that the tongues 17 are provided with spaced rows of openings 21 so that the diameter of the device may be adjusted in accordance with the diameter of the tire. In order that the device may snugly fit the tire, there is provided an adjusting device. This device comprises a lever 26 which has secured to one end a chain 27 while spaced inwardly from the end of the lever are chains 28. The chains 27 and 28 carry at their outer ends hooks 29 and these hooks are adapted to be removably received in openings 30 provided in the ends of the sections 12. By reference to Figure 3 of the drawings it will be seen that the sections 12 may be properly drawn together prior to the insertion of the pins 24 so that the device may snugly fit the tire. In addition, the adjusting devices may be utilized to relieve circumferential strain when it is desired to remove the pins to remove the device from the tire.

The invention is susceptible of various changes in its form, proportions and minor details of construction and the right is herein reserved to make such changes as properly fall within the scope of the appended claim.

Having described the invention what is claimed is:—

An anti-skid device for vehicle tires comprising a tire encircling member formed of separate sections having their inner faces shaped to conform to the shape of the periphery of the tire, said sections having a tread member and side members, anti-skid devices carried by the sections, a substantially U-shaped coupling member having a recess in its inner face, means for securing said coupling member to one end of each section, whereby the walls of the recess together with said tread member define a pocket, a tongue extending from the other end of the section and adapted to be received in said pocket in a companion section, and a screw threaded through the coupling member and extending through said tongue and into the said end of the first mentioned section to removably secure the sections together to provide a tire encircling band.

In testimony whereof I affix my signature.

EARL HARVEY.